No. 800,688. PATENTED OCT. 3, 1905.
H. W. SOUTHWORTH.
MACHINE FOR MOLDING HIDES.
APPLICATION FILED OCT. 24, 1904.
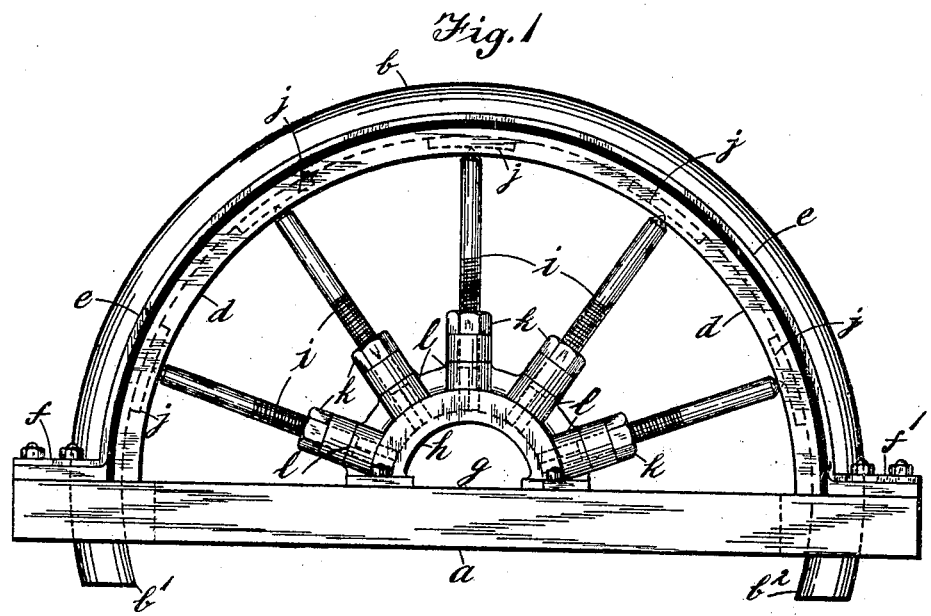
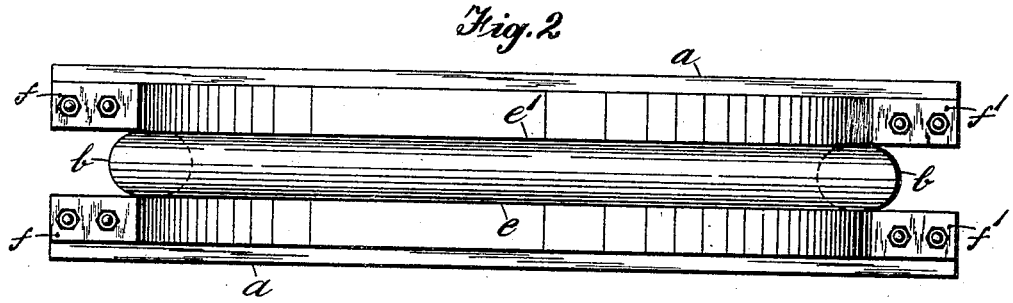
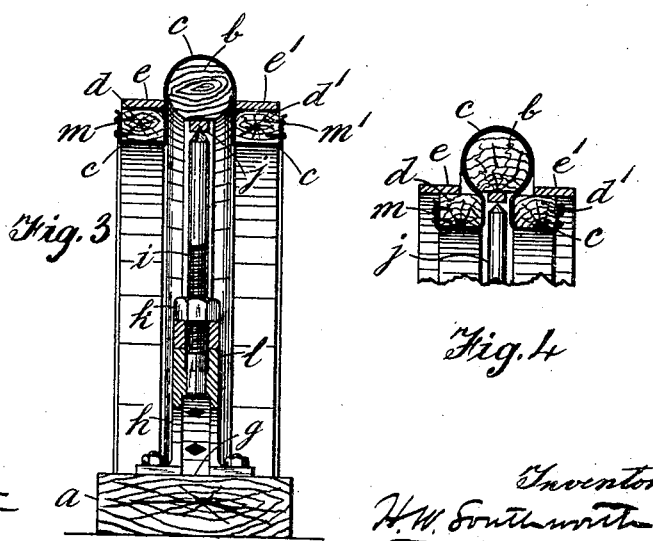
Witnesses:
Inventor:
H. W. Southworth
by Wilkinson & Fisher
his Attorneys

UNITED STATES PATENT OFFICE.

HORATIO WOODBURN SOUTHWORTH, OF LONDON, ENGLAND.

MACHINE FOR MOLDING HIDES.

No. 800,688.        Specification of Letters Patent.        Patented Oct. 3, 1905.

Application filed October 24, 1904. Serial No. 229,887.

*To all whom it may concern:*

Be it known that I, HORATIO WOODBURN SOUTHWORTH, a citizen of the United States, and a resident of Hyde Park Hotel, Albert Gate, London, England, have invented a new and useful Machine for Molding Hides; and I hereby declare that the following is a full, clear, and exact description of the invention, which will enable others skilled in the art to which it appertains to make and use the same.

My invention relates to improvements in machines for molding hides into any desired shape—as, for instance, for outer covers for the tires of motor-vehicles; and the objects of my improvements are, first, to provide means by which the hide after having been softened—for instance, by glycerin—and then rendered waterproof by animal, vegetable, or mineral oils, gum, beeswax, or albumen is stretched radially upon the mold to the shape required; second, to offer facilities for bringing together the sides of the mold in order to complete the required shape of the finished hide, and, third, to hold the edges of the hide firmly and securely while it is being stretched. I attain these objects by the mechanism or apparatus illustrated in the accompanying drawings, in which—

Figure 1 is a side view of a machine when in position for forming the outer cover of a tire for motor-vehicles. Fig. 2 is a plan of the machine. Fig. 3 is a vertical transverse section of the machine, and Fig. 4 is a section showing the manner in which the sides of the hide are drawn together to form the inner curved sides of the cover.

Similar letters refer to similar parts throughout the several views.

$a$ is a strong base (shown of wood) upon which the apparatus is carried.

$b$ is a mold or block upon which the prepared hide $c$ is to be stretched and molded. The ends of the mold $b$ extend freely downward for a sufficient distance at $b'$ $b^2$ between the side frames $d$ $d'$, the outer circumference of the part of the mold above the frame $a$ being equal in size and shape to the inner surface of the finished hide after molding.

$d$ $d'$ are two strong semicircular side frames (also shown of wood) held in position by metal bands or frames $e$ $e'$, passing round their outer circumference and having their lower ends strongly bolted to the base $a$ at $f$ $f'$, so as to hold the frames $d$ $d'$ steadily in position, but to allow them to be driven toward each other laterally when required.

At the center $g$ of the apparatus is fixed upon the base $a$ a semicircular bracket $h$, having at its circumference a sufficient number of radial openings, in which fit freely screwed bars $i$, the outer ends of which press upon plates $j$, fixed upon the inner side of the mold $b$, and $k$ $k$ represent nuts screwed upon the bars $i$ and fitting with the intervention of washers against bosses $l$ $l$ upon the bracket $h$, so that when the nuts are turned round (the bars $i$ being prevented from turning) the plates $j$ and the wooden mold $b$ are forced radially outward and expanded.

The inner ends of the bars $i$ are shown square and fit freely in square holes in the bosses $l$.

In order to use the machine, the piece of prepared hide $c$ of suitable size and shape is stretched upon and round the mold $b$, its edges being brought down inside the frames $d$ $d'$, then under the lower side of the latter, (which may be roughened to prevent the hide from slipping,) and up against its outside, upon which they are firmly nailed or otherwise fastened at $m$ $m'$. The plates $j$ are then forced out radially by turning the nuts $k$ until the mold $b$ has pressed out the hide $c$ until the latter has attained its required shape, its inner side being in close contact with the outside of the mold $b$. If it is desired that the outer parts of the hide shall be brought together against the lower side of the mold $b$, the semicircular wooden frames $d$ $d'$ can then be hammered or otherwise brought toward each other, as shown in Fig. 4, so as to press the hide round the inner part of the mold. When the hide is sufficiently dry, the nuts can be unscrewed and the molded hide removed. The hide so formed will form one-half of the outer tire-cover, and another similar one is joined to it in any suitable way, so as to form a complete cover.

By varying the shape of the mold $b$ and of the other parts of the machine it is evident that it may be applied to molding other articles as well as covers for tires—as, for instance, foot-balls—and this without departing in any way from the essential features of my invention.

Having fully described my invention, what I desire to claim, and secure by Letters Patent, is—

1. In a machine for molding hides, the combination of a curved mold, side frames located on either side of said mold, fixed bands carrying said side frames, plates resting under said mold, and means for adjusting said plates toward said mold, substantially as described.

2. In a machine for molding hides, the combination of a supporting-frame, curved metal frames secured thereto, side frames movably supported by said metal frames, a mold within said side frames, plates bearing against said mold, and means for moving said plates toward said mold, substantially as described.

3. In a machine for molding hides, the combination of a supporting-frame, curved metal frames fastened to said frame, movable side frames supported by said metal frames, a mold located between said metal frames, plates resting against said mold, and means for adjusting said plates, including radial hollow bosses, bars provided with screw-threads, and nuts mounted on said bars, substantially as described.

In witness whereof I have hereunto set my hand in the presence of two witnesses.

HORATIO WOODBURN SOUTHWORTH.

Witnesses:
   ARTHUR E. EDWARDS,
   ALFRED G. BRATTON.